UNITED STATES PATENT OFFICE.

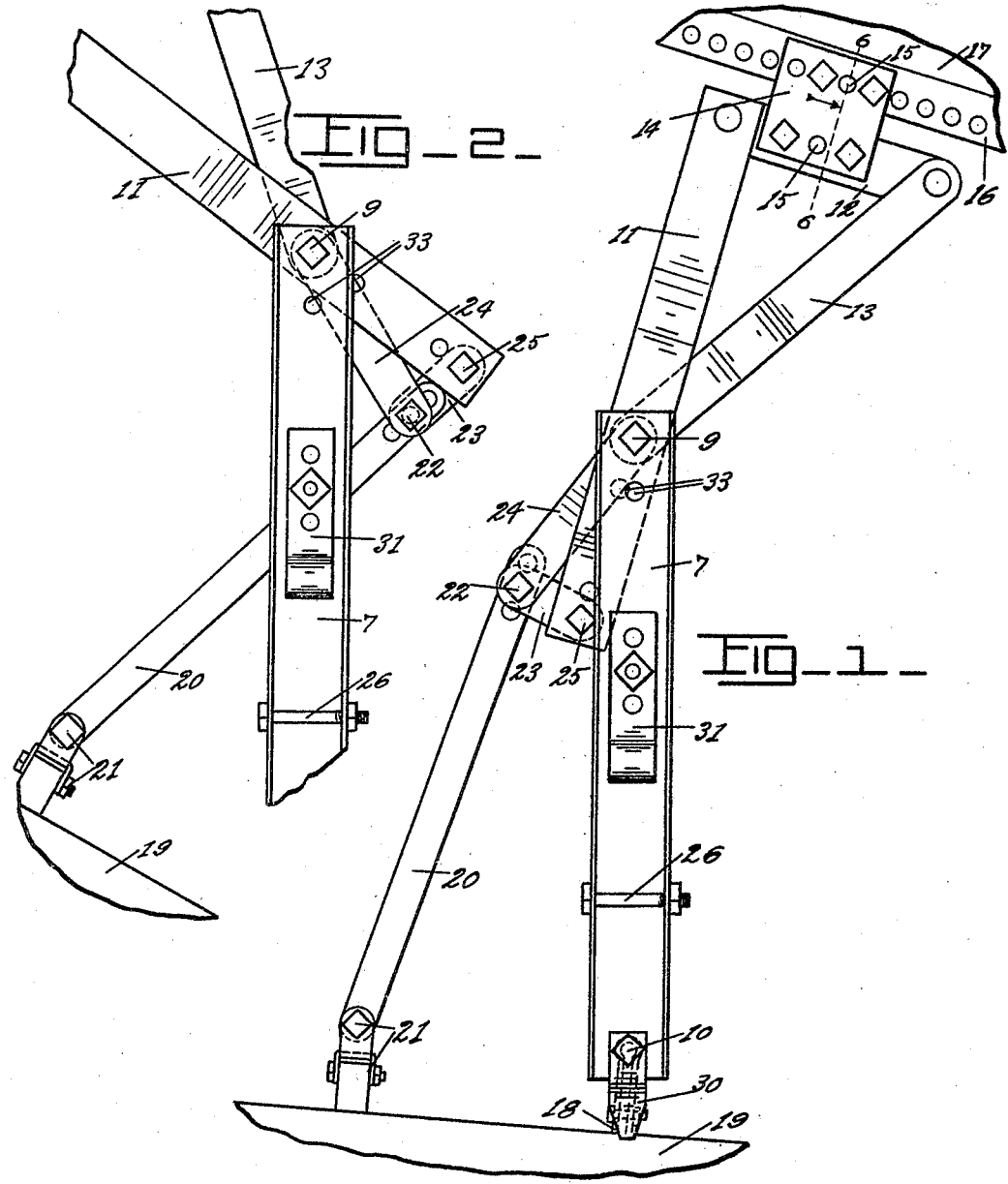

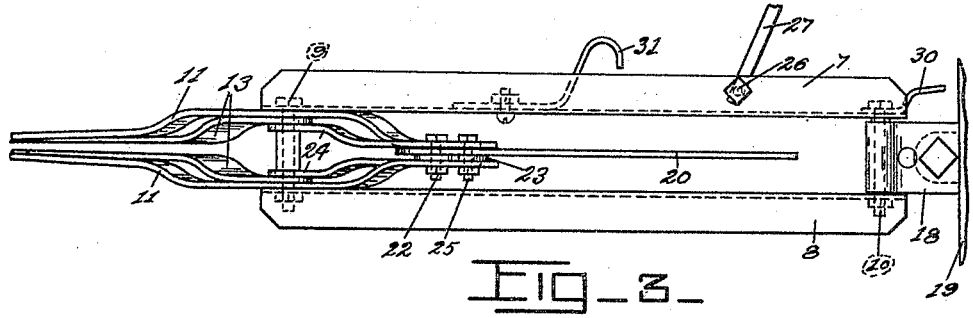

WILLIAM E. COOK, OF MINNEAPOLIS, MINNESOTA.

HITCH.

1,404,928.  Specification of Letters Patent.  Patented Jan. 31, 1922.

Application filed August 17, 1920. Serial No. 404,265.

*To all whom it may concern:*

Be it known that I, WILLIAM E. COOK, a citizen of the United States, residing at Minneapolis, in the county of Hennepin and State of Minnesota, have invented certain new and useful Improvements in Hitches, of which the following is a specification.

This invention relates to hitches and the object is to provide a practical and efficient hitch especially adaptable for hitching together tractors and binders or other similar implements and machinery. A particular feature of the tractor is to turn the binder pulled by it at sharp angles so that corners may be cut smoothly and quickly to either the right or left. Further objects and advantages of the invention will be disclosed in the following specification and in the accompanying drawings, in which:

Fig. 1 is a plan view of the hitch, shown connected to two vehicles being turned to the right.

Fig. 2 is a plan view of the hitch as seen when turning to the left, with various parts broken away.

Fig. 3 is a side elevation of the hitch as seen from the left in Fig. 2, with parts broken away.

Fig. 4 is a side elevation of the hitch, with various parts thereof removed and showing it as used when pulling idle binders over roads, etc.

Fig. 5 shows a modified arrangement of the hitch.

Fig. 6 is a sectional detail view on the line 6—6 in Fig. 1.

Referring to the drawings by reference numerals 7 and 8 designate two channel beams which are connected at their ends by bolts 9 and 10 and which form the main body member of the hitch. A double hitching lever 11, having a cross beam 12 and a double brace 13, is pivotally mounted on said bolt 9. Two reversible plates 14, having a number of variously spaced bolt holes 15, are designed to fasten the beam 12 rigidly to the draft beam 16 of the tractor 17. A hitching piece 18 is pivotally mounted on the bolt 10, and is adapted to be bolted to a binder (or other implement) 19 so as to enable the hitch to swing horizontally therefrom.

The binder 19 is further connected to the hitch by a link 20 which is pivotally connected at 21 by a universal connection to the cutting or platform side of the binder. The other end of the link 20 is pivoted on a bolt 22 (see Figs. 1, 2 and 3). The bolt 22 also secures one end of a short link bar 23 and the ends of two link braces 24. It may be noticed that the link 20 and the lever 11 are provided with several bolt holes to accommodate the bolts 22 and 25 respectively, the object being to provide adjustment for effecting quicker or slower action and sharper or more gradual turns as required. To obtain a still quicker action in turning, the parts 22, 23 and 24 may be removed altogether and the rod 20 pivoted directly on the bolt 25 (see Fig. 5). A horizontal bolt 26 is provided in the beam 7 and on it may be secured the well known tilting lever 27 (see Fig. 3) which is common to all binders for adjusting the height of the cutter bar.

Another feature and advantage of this device is its adaptability for trailing or transporting binders over roads, etc. As is well known a binder is often too wide to be pulled forwardly over an ordinary road, and to overcome this difficulty it has been customary to provide a wheel truck under the heavier part thereof and a smaller tongue truck for supporting the platform, which is then pulled forward, thus carrying the binder side ways over the road. In Fig. 4 of the drawing 28 designates the platform and 29 the horizontal carrier of a binder. Instead of supporting said platform on a tongue truck I secure it to my channel beam 7 by a finger piece 30 which engages in a suitable slot in the platform frame and by a hook 31 which is adjustably bolted to said channel beam. In this case the members 20, 22, 23 and 24 are detached and the lever 11 is secured in longitudinal alignment to the channel beams 7 and 8 by a bolt 32 which is inserted in bolt holes 33. Thus when the lever 11 is secured on the tractor which is to pull the binder, the platform 28 will be supported at a proper distance off the ground and may be pulled forward in the same manner as when supported on a tongue truck.

With this device in use it will thus be seen that the tractor can be turned at a sharp angle in either direction without letting the tractor wheels interfere with the hitch and the binder will follow the tractor according to the adjustments made. Such adjustments are particularly desirable when more than one binder is being trailed behind the tractor.

It is understood that this specification and drawings are purely illustrative of my invention and shall not be interpreted in a limiting sense, but that the invention may also embody suitable modifications, provided, however, that such modifications come within the spirit and scope of the appended claims.

Having now therefore fully shown and described my invention, what I claim to be new and desire to protect by Letters Patent is:

1. A hitch of the class described consisting of a main body member pivotally secured at its rear end to an implement to be drawn, a lever fulcrumed at the front end of the body member and extending normally in substantial alignment therewith, means for rigidly connecting the front arm of the lever to a tractor, and a link bar connecting the rear arm of the lever to the implement to be drawn.

2. A hitch of the class described consisting of a main body member, the same being flexibly secured at its rear end to an implement to be drawn, a lever fulcrumed at the front end of the body member and extending normally in substantial alignment therewith, a link bar adapted to universally connect the rear arm of the lever to the implement and means for rigidly securing the front arm of the lever to a tractor.

3. A hitch of the class described consisting of a main body member, means for pivotally securing the rear end thereof to an implement to be drawn, a lever fulcrumed to the front end of the body member, said lever having a relatively long arm extending forwardly from its fulcrum and a short arm extending rearwardly therefrom, means for rigidly securing said long arm to a tractor and a link bar connecting the short arm to said implement.

4. A hitch adapted to connect a tractor to an implement to be drawn, said hitch being adapted to break on a pivot substantially midway between the tractor and the implement, and consisting of a main body member extending from said pivot rearward to the implement and there secured, a lever member extending forwardly from said pivot to the tractor, said lever member having a short arm extending rearwardly from said pivot, a link bar connecting the short lever arm to the implement, and means for rigidly securing the forward arm of the lever to the tractor.

5. A hitch adapted to connect a tractor to an implement to be drawn, said hitch comprising a body member pivotally secured at its rear end to the implement, a lever member extending forwardly from the front end of the body member, means for rigidly securing the lever member to the tractor, a pivot adapted to adjustably connect the lever member to the body member in selective positions, said pivot being the fulcrum of the lever member and constituting a breaking joint in the hitch, a link bar pivotally secured to the implement at one end, and means for adjustably securing its other end to a rear extension of the lever member.

In testimony whereof I affix my signature.

WILLIAM E. COOK.